United States Patent [19]

Takano

[11] Patent Number: 5,430,667
[45] Date of Patent: Jul. 4, 1995

[54] HARDWARE ARRANGEMENT FOR FAST FOURIER TRANSFORM HAVING IMPROVED ADDRESSING TECHNIQUES

[75] Inventor: Hideto Takano, Tokyo, Japan
[73] Assignee: NEC Corporation, Tokyo, Japan
[21] Appl. No.: 66,681
[22] Filed: May 24, 1993
[30] Foreign Application Priority Data
  May 22, 1992 [JP] Japan .................................. 4-130354
[51] Int. Cl.⁶ ....................... G06F 15/00; G06F 15/40
[52] U.S. Cl. .................................................... 364/726
[58] Field of Search ............................... 364/726, 725

[56] References Cited

U.S. PATENT DOCUMENTS

| | | | |
|---|---|---|---|
| 4,393,457 | 7/1983 | New ...................................... | 364/726 |
| 5,091,875 | 2/1992 | Wong et al. ........................... | 364/726 |
| 5,095,446 | 5/1992 | Jingu .................................... | 395/165 |
| 5,224,063 | 6/1993 | Matsunaga ............................. | 364/726 |

OTHER PUBLICATIONS

Academic Press, Inc., Handbook of Digital Signal Processing—Chapter 7, "Fast Fourier Transforms", by Douglas F. Elliott, pp. 527–559, 1987.

*Primary Examiner*—Roy N. Envall, Jr.
*Assistant Examiner*—Emmanuel L. Moise
*Attorney, Agent, or Firm*—Whitham, Curtis, Whitham & McGinn

[57] ABSTRACT

A hardware arrangement for a fast Fourier Transform includes, an arithmetic unit for executing said fast Fourier Transform, a data memory for storing data to be executed and storing results thereof, and an address generator for generating addresses to be applied to said data memory. The hardware arrangement further is provided with a bit rotation circuit coupled to receive each of said addresses. The circuit rotates a predetermined number of lower bits of each of said addresses such as to locate the least significant bit at the upper bit position of said predetermined number of lower bits and shift the remaining bits towards the least significant bit by one.

2 Claims, 6 Drawing Sheets

| MEMORY ADDRESS | DATA STORED IN ADDRESS |
|---|---|
| (0)000 | X(0) |
| (1)001 | X(4) |
| (2)010 | X(2) |
| (3)011 | X(6) |
| (4)100 | X(1) |
| (5)101 | X(5) |
| (6)110 | X(3) |
| (7)111 | X(7) |

| MEMORY ADDRESS | FIRST STAGE | | | SECOND STAGE | | | THIRD STAGE | | |
|---|---|---|---|---|---|---|---|---|---|
| A1 | A2 | A3 | A4 | A2 | A3 | A4 | A2 | A3 | A4 |
| (0)000 | 000 | 000 | (0)000 | 000 | 000 | (0)000 | 000 | 000 | (0)000 |
| (1)001 | 000 | 001 | (1)001 | 000 | 010 | (2)010 | 000 | 100 | (4)100 |
| (2)010 | 010 | 000 | (2)010 | 000 | 001 | (1)001 | 000 | 001 | (1)001 |
| (3)011 | 010 | 001 | (3)011 | 000 | 011 | (3)011 | 000 | 101 | (5)101 |
| (4)100 | 100 | 000 | (4)100 | 100 | 000 | (4)100 | 000 | 010 | (2)010 |
| (5)101 | 100 | 001 | (5)101 | 100 | 010 | (6)110 | 000 | 110 | (6)110 |
| (6)110 | 110 | 000 | (6)110 | 100 | 001 | (5)101 | 000 | 011 | (3)011 |
| (7)111 | 110 | 001 | (7)111 | 100 | 011 | (7)111 | 000 | 111 | (7)111 |

HARDWARE ARRANGEMENT FOR FAST FOURIER TRANSFORM HAVING IMPROVED ADDRESSING TECHNIQUES

BACKGROUND OF THE INVENTION

1. Field of the Invention

The present invention relates generally to a hardware arrangement for computing Fast Fourier Transform and more specifically to such an arrangement via which data stored in a memory can effectively be addressed.

2. Description of the Related Art

A very fast algorithm for computing a Fourier transform, known as the Fast Fourier Transform (FFT), created a revolution in applications for digital signal processing. The FFT itself is very well known in the art of digital signal processing and hence details thereof will not be given for the sake of brevity. Merely by way of example, the detailed explanation of the FFT is given in a book entitled "Handbook of Digital Signal Processing", pages 527-558, edited by Douglas, F. Elliott and published by Academic Press, Inc.

Before discussing the present invention it is deemed advantageous to briefly describe a known addressing technique for computing the FFT with reference to FIGS. 1-3C.

FIG. 1 is a block diagram schematically showing a hardware arrangement for computing FFT, while FIG. 2 is a flow diagram for 8-point DIT (decimation-in-time) FFT. It should be noted that functional blocks which are not directly concerned with the present invention are not shown in FIG. 1 for the sake of simplifying the descriptions.

The arrangement of FIG. 1 includes, a program memory 10, an instruction decoder 12, an address generator 14, an arithmetic unit 16, and a data memory 18. A plurality of instructions, which are stored in the memory 10 for computing the FFT, are successively read out therefrom and decoded by the instruction decoder 12. The data memory 18 stores a plurality of data for computing the FFT and also is arranged to store the results of arithmetic operations.

A first data for computing the FFT is retrieved from the data memory 18 using an address applied from the address generator 14 via an address bus 20. The first data obtained from the memory 18, is applied to the arithmetic unit 16 via a data bus 22. Similarly, a second data is retrieved from the memory 18 and then applied to the arithmetic unit 16. On the other hand, the arithmetic unit 16 is supplied with an arithmetic instruction from the decoder 12, after which it executes the first operation. The result of the computation is applied, via the data bus 22, to the memory 18 and stored therein. These operations are repeated until a sequence of predetermined operations is completed.

Reference is made to FIG. 2 which is the flow diagram for an 8-point DIT FFT which includes three stages of operations. This flow diagram is well known to those skilled in the art.

As shown in FIG. 2, input data x(0)-x(7) which are arranged in the order of x(0), x(4), x(2), x(6), x(1), x(5), x(3), and x(7), undergo the calculations of "addition", "substraction", and "complex multiplication". The final result of these calculations are depicted by X(0)-X(7) at the rightmost side of FIG. 2. In FIG. 2, each of the notations $W_8^0$, $W_8^1$, $W_8^2$, $W_8^3$ is a complex number called a twiddle factor which is multiplied by the result of the preceding operation (viz., addition or subtraction). The resulting pattern of a pair of crossed arrows is known as an "FFT butterfly".

An important point worth noting about the DIT algorithm (as well as most other FFT algorithms) is that in order to arrange the output sequence (X(0)-X(7)) in natural order, the input sequence should be stored in the required order of x(0), x(4), x(2), x(6), x(1), x(5), x(3), and x(7). The order of the input sequence can be determined in a relatively simple manner of bit-reversal. The definition of bit-reversed order in the case shown in FIG. 2 is as follows:

| Address (Binary) | Data | Bit-Reversed Adresses | Data |
|---|---|---|---|
| 000 | x(0) | 000 | x(0) |
| 001 | x(1) | 100 | x(4) |
| 010 | x(2) | 010 | x(2) |
| 011 | x(3) | 110 | x(6) |
| 100 | x(4) | 001 | x(1) |
| 101 | x(5) | 101 | x(5) |
| 110 | x(6) | 011 | x(3) |
| 111 | x(7) | 111 | x(7) |

That is, each of the bit-reversed addresses is obtained by exchanging the most significant bit (MSB) of the corresponding bit address with the least significant bit (LSB) thereof.

Accordingly, the input data x(0)-x(7) are respectively stored in the memory 18 (FIG. 1) in the order as shown in the rightmost row. Thereafter, the memory 18 is addressed in the order shown in the second row from the right (viz., Bit-Reversed Addresses).

The pairs of calculations in each of the three stages are different. In general, the distance between each of the pairs at a m-th stage is depicted by $2^{m-1}$ (m is a positive integer). Further, the number of the calculation blocks of each stage is defined by $8/2^{3-m+1}$.

That is, the first and second stages include four and two calculation blocks, while the third stage includes one calculation block. These blocks are identical in terms of calculating each other.

In order to compute the FFT, it is a current practice to execute the above-mentioned "butterfly" calculations using a pipeline. The pipelined operation includes the following four pipeline stages as shown in FIG. 3:

(1) data retrieval from the memory 18 (depicted by A);

(2) complex multiplication (depicted by B);

(3) butterfly calculation (depicted by C); and (4) storing of the result in the memory 18 (depicted by D).

According to a known method of calculating the FFT, the address generator 14 should be initialized (depicted by I in FIG. 3) before starting different calculation blocks.

Therefore, the first stage requires 20 time slots while the second stage requires 12 times slots. And, the third stage requires 8 time slots. The total time slots amounts to 40 in this particular case.

It is therefore highly desirable to reduce the number of total time slots by omitting the initialization of the address register 14 before implementing each of the calculation blocks.

SUMMARY OF THE INVENTION

It is an object of the present invention to provide a hardware arrangement for computing the FFT which can effectively reduce the number of total time slots required for the pipelined operations.

More specifically, an aspect of the present invention resides in a hardware arrangement for a fast Fourier Transform wherein the hardware arrangement includes, an arithmetic unit for executing the fast Fourier Transform, a data memory for storing data to be executed and storing results thereof, and an address generator for generating addresses to be applied to the data memory, the hardware arrangement comprising: first means coupled to receive each of the addresses, the means rotating a predetermined number of lower bits of each of the addresses such as to locate the least significant bit at the upper bit position of the predetermined number of lower bits and shift the remaining bits towards the least significant bit by one.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be discussed with reference to FIGS. 2, and 4–8.

Figure 1:
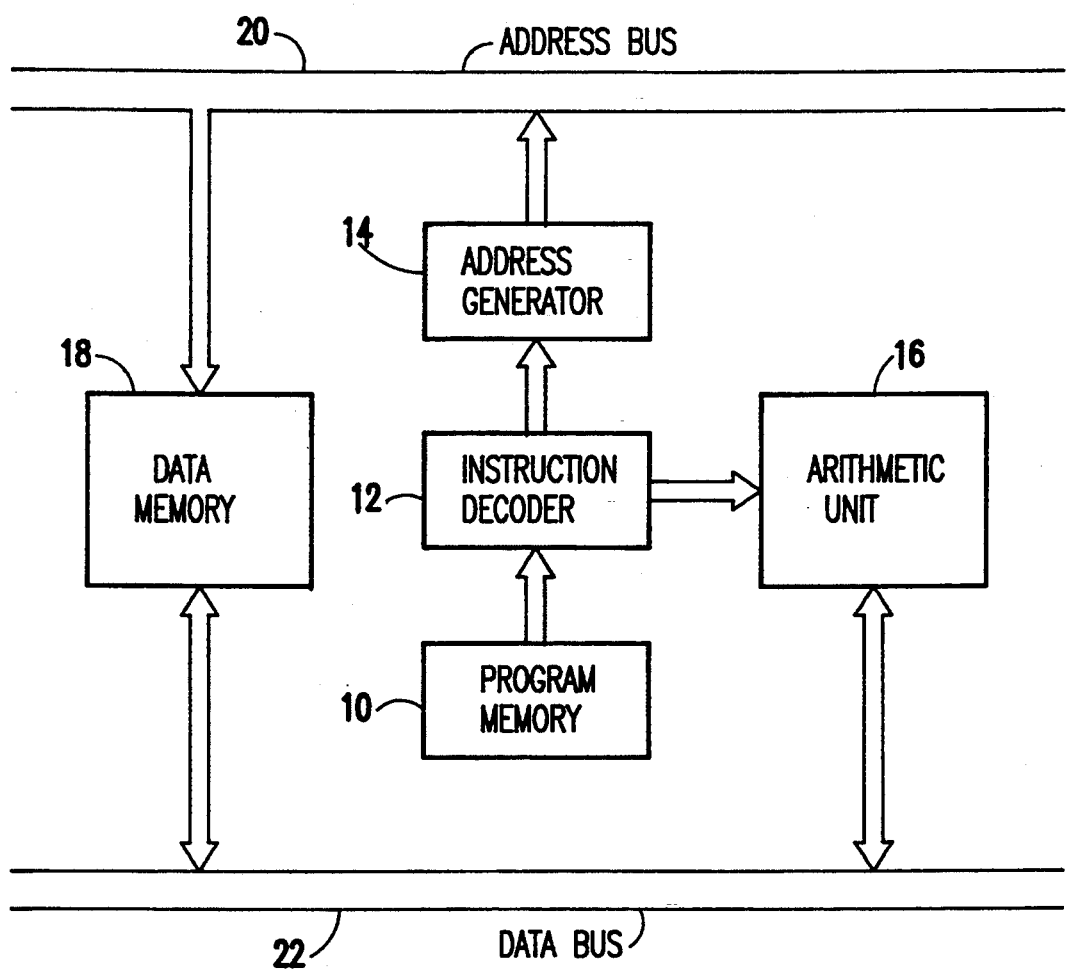
FIG. 1 is a block diagram schematically showing a known hardware arrangement for computing the FFT, discussed in the opening paragraphs of the instant disclosure.
Figure 4:
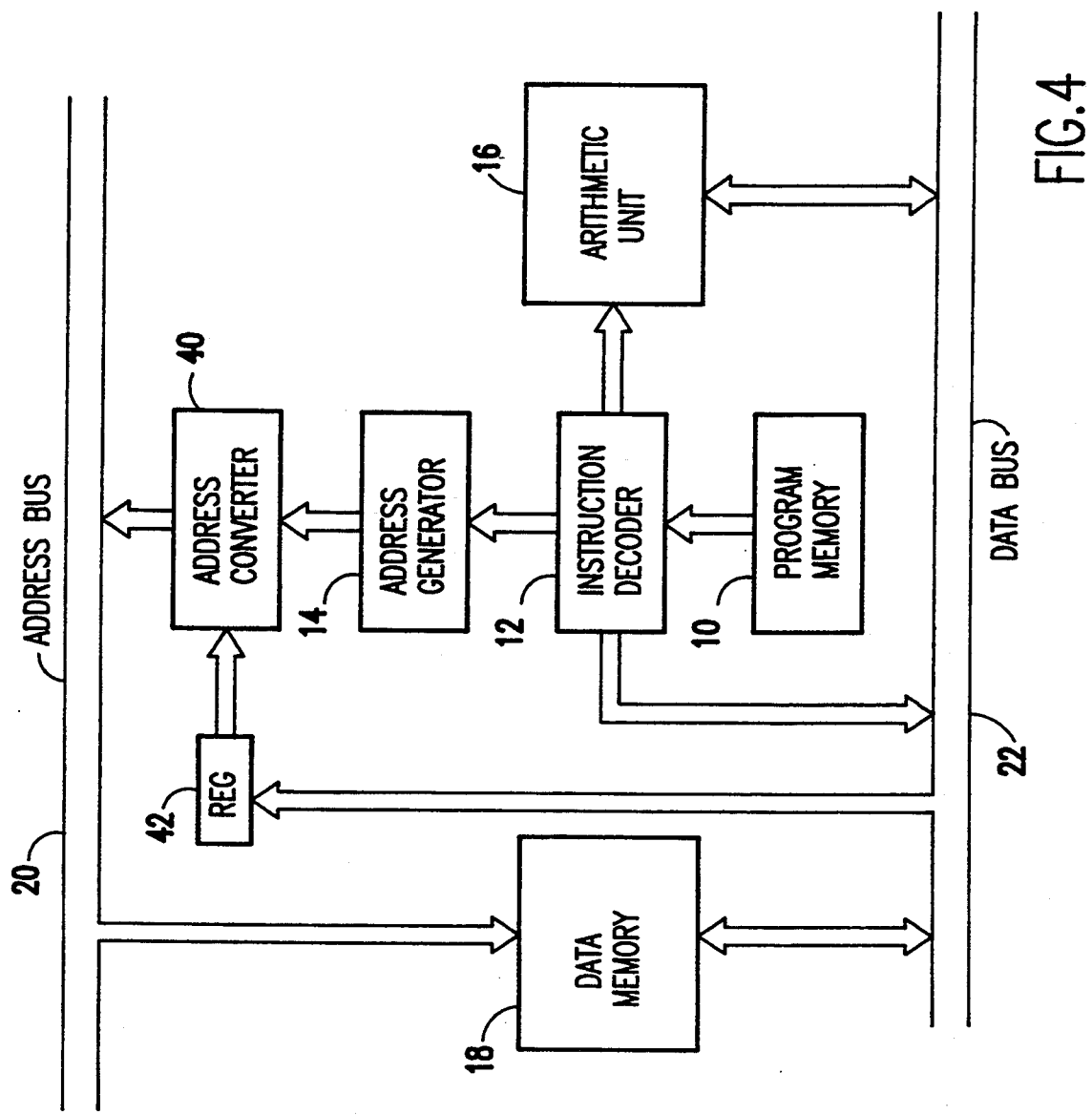
FIG. 4 is a block diagram schematically showing a preferred embodiment of the present invention.

The arrangement of FIG. 4 differs from that of FIG. 1 in that the former arrangement further includes an address converter 40, and a register 42. The remaining portions of FIG. 4 are substantially identical to those of FIG. 1 and thus further descriptions thereof will not be discussed merely for the sake of brevity.

Figure 2:
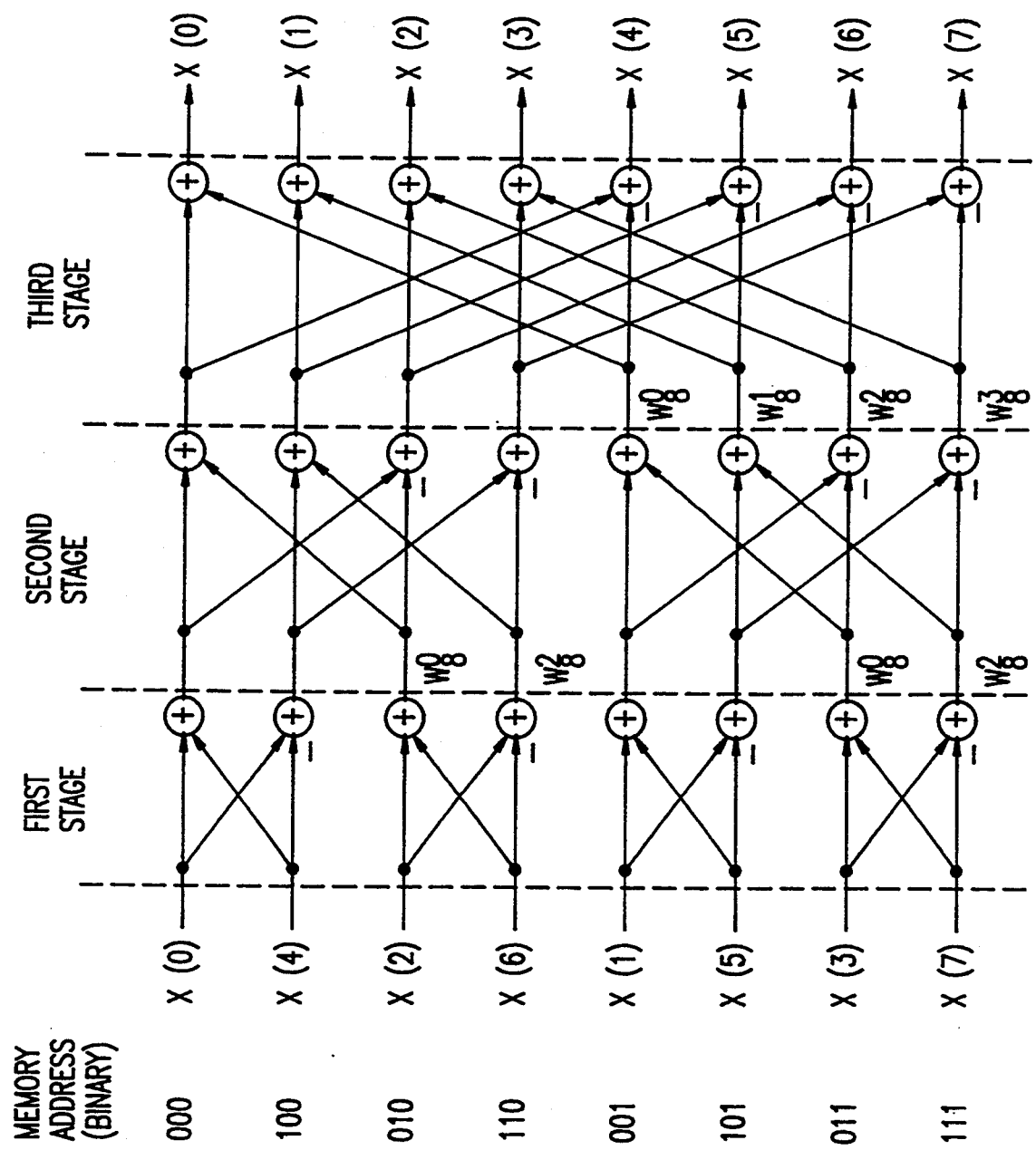
FIG. 2 is a flow diagram for 8-point DIT FFT, discussed in the opening paragraphs of the instant disclosure, this figure also being referred to in the discussion of the present invention.
Figure 3A:
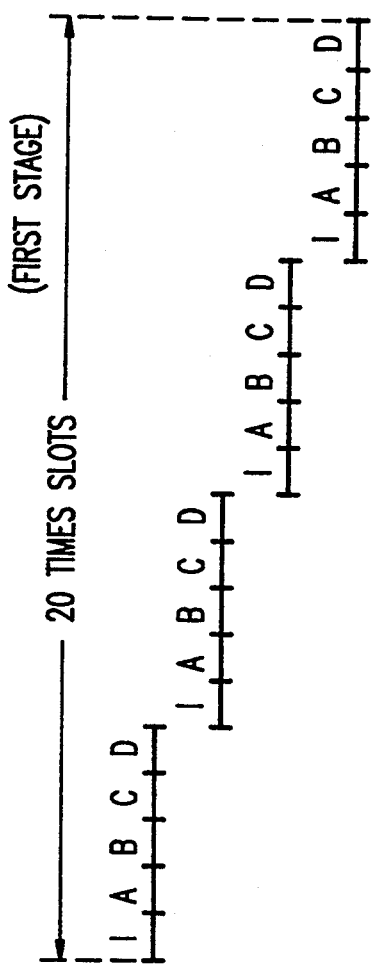
FIGS. 3A–3C each is a timing chart for describing conventional pipeline operations, discussed in the opening paragraphs of the instant disclosure.
Figure 3C:
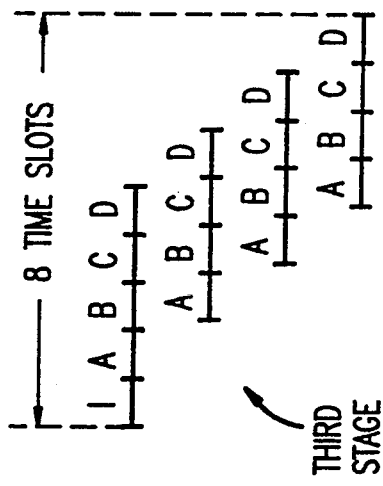
Figure 3B:
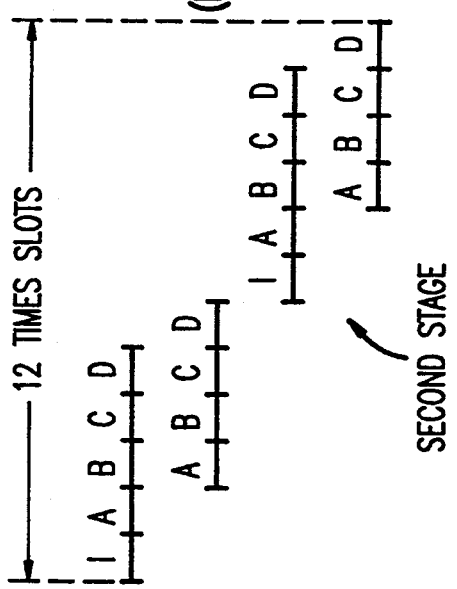

The address converter 40 rotates lower bits of the address applied from the address generator 14. The bit length which is subject to the bit-rotation is determined by the content of the register 42 which is applied from the instruction decoder 12 via the data bus 22. In more specific terms, the register 42 stores "1" (001 in binary) when the first stage of FIG. 2 is implemented. However, in this instance, no bit-rotation occurs in that the bit length to be rotated is "one". Further, the register 42 stores "2" (010 in binary) when the second stage of FIG. 2 is carried out. Similarly, the register 42 stores "3" (011 in binary) in the case where the third stage of FIG. 2 is executed.

Figure 5:
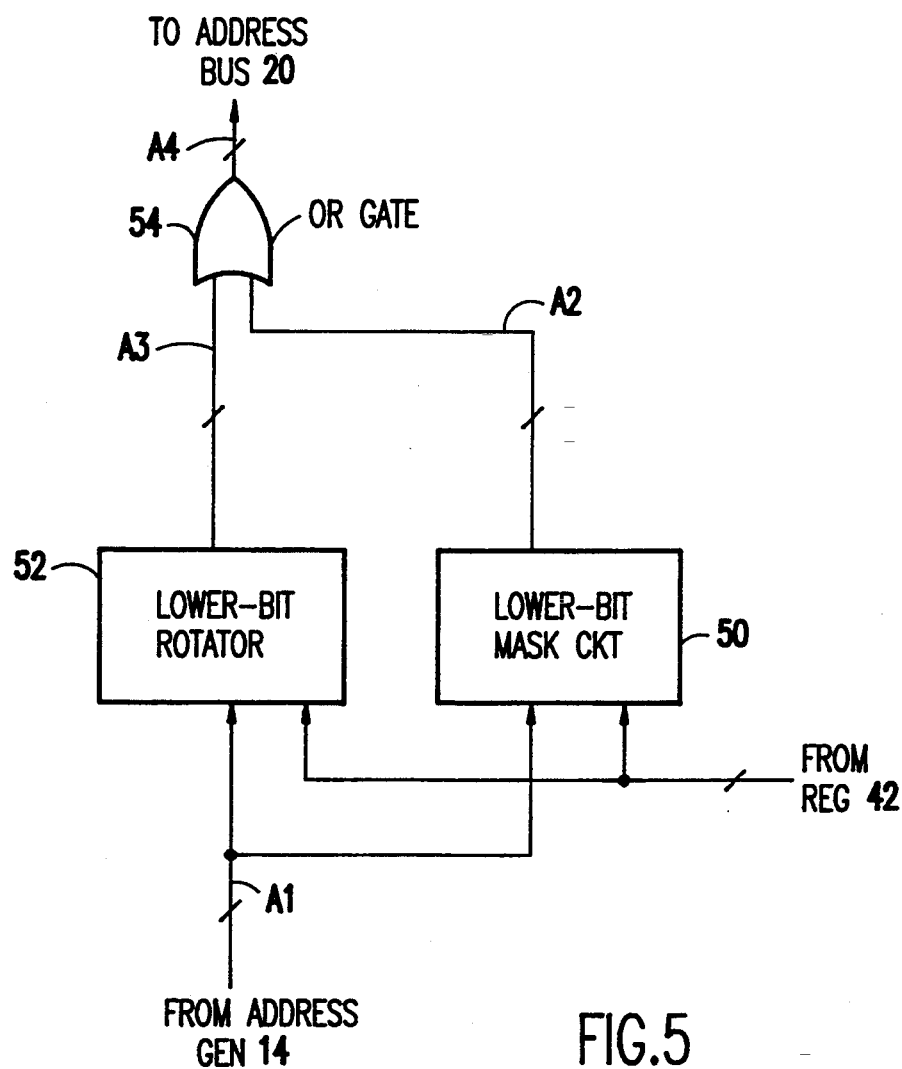
FIG. 5 is a block diagram showing an arrangement of one block of FIG. 4.

FIG. 5 is a block diagram showing in detail the arrangement of the address converter 40.

As shown in FIG. 5, the address converter 40 (FIG. 4), includes a lower-bit mask circuit 50, a lower-bit rotator 52, and an OR gate 54. The register 42 (FIG. 4) is supplied with 001, 010, and 011 when the first, second, and third stages are to be executed.

The operations of the arrangement of FIG. 5 will be discussed with reference to the tables shown in FIGS. 6 and 7.

The memory 18 stores therein the data x(0), x(4), x(2), x(6), x(1), x(5), x(3), and x(7) at the memory addresses 0–7 (decimal) in natural order, respectively. In the first stage, the register 42 stores 001. The lower-bit mask circuit 50 masks the LSB of the address A1 and outputs a signal A2, while the lower-bit rotator 52 generates a signal A3.

That is, the lower-bit mask circuit 50 is coupled to receive each of the addresses from the address generator 14 and also receive 001 (viz., the content of the register 42) in this case. The mask circuit 50 sets logic 0s to the LSB of each of the addresses. On the other hand, the lower-bit rotator 52 is coupled to receive each of the addresses and the content of the register 42. The rotator 52 maintains the LSB in this case and setting a logic 0 to each of the remaining upper bits.

In this case, the outputs of the OR gate 54 are identical to the addresses A1, respectively. Thus, the data x(0), x(4), x(2), x(6), x(1), x(5), x(3), and x(7) are retrieved from the memory 18.

Figures 6, 7:
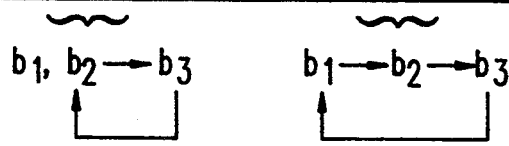
FIGS. 6 and 7 are tables for describing the operations of the preferred embodiment.

In the second stage, the lower-bit mask circuit 50 masks the lower two bits of the address signal A1, while the lower-bit rotator 54 rotates the lower two bits as shown in the bottom of FIG. 7. Thus, the addresses outputted from the OR gate 54 are, x(0), x(2), x(4), x(6), x(1), x(3), x(5), and x(7) in this order.

That is, the lower-bit mask circuit 50 is coupled to receive each of the addresses from the address generator 14 and also receive 010 (viz., the content of the register 42). The mask circuit 50 sets logic Os to the lower two bits. On the other hand, the lower-bit rotator 52 is coupled to receive each of the addresses and the content of the register 42. The rotator 52 rotates the lower two bits and sets a logic 0 to each of the remaining upper bits.

Lastly, in the third stage, the lower-bit mask circuit 50 masks the lower three bits (all the bits in this particular case) and outputs the signal A2. On the other hand, the lower-bit rotator 52 rotates the lower three bits as shown in the bottom of FIG. 7. Thus, the addresses generated from the OR gate 54 are, x(0), x(1), x(4), x(5), x(2), x(3), x(6), and x(7) in this order.

Figure 8:
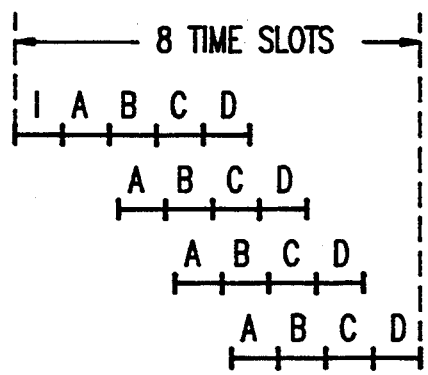
FIG. 8 is a timing chart for describing the pipelined operations of the embodiment shown in FIGS. 4–8.

It is understood that according to the present invention, the address generator 14 is initialized once before the operations of each stage as shown in FIG. 8. That is, each stage can be executed only during 8 time slots and thus the three stages can be executed by 24 time slots in total. This indicates that the time slots required by this particular case can be reduced by 16 time slots as compared with the above-mentioned known arrangement.

The present invention has been discussed with the 8-point FFT. However, the algorithm of the present invention is extendable to more than 8-point (e.g., 16-and 32-point FFTs).

It will be understood that the above disclosure is representative of only one possible embodiment of the present invention and that the concept on which the invention is based is not specifically limited thereto.

What is claimed is:

1. A hardware arrangement for a fast Fourier Transform, comprising:
   an arithmetic unit for executing said fast Fourier Transform;
   a data memory connected to said arithmetic unit for storing data to be executed by said arithmetic unit and storing results thereof;
   an address generator for generating addresses to be applied to said data memory; and
   an address converting means coupled to receive each of said addresses and connected to supply converted addresses to said data memory, said address converting means rotating a predetermined number of lower bits of each of said addresses such as to locate the least significant bit at the upper bit position of said predetermined number of lower bits and shift the remaining bits towards the least significant bit by one, wherein said address converting means includes:
   first means coupled to receive each of said addresses and said predetermined number of lower bits, said first means setting logic 0s to said predetermined number lower bits of each of said addresses, said first means outputting a first signal;
   second means coupled to receive each of said addresses and said predetermined number of lower bits, said second means rotating said predetermined number of lower bits and setting a logic 0 to each of the remaining upper bits, said second means outputting a second signal; and
   third means coupled to said first and second means, said third means exhibiting a logical operation on said first and second signals.

2. A hardware arrangement as claimed in claim 1, wherein said address converting means further includes fourth means for storing said predetermined number of lower bits which is applied to said first and second means.

* * * * *